United States Patent
Metras et al.

(10) Patent No.: US 9,124,053 B2
(45) Date of Patent: Sep. 1, 2015

(54) CORDAGE RESTRAINT AND MANAGEMENT SYSTEM

(71) Applicants: Justin M Metras, Portland, OR (US); Mieszko K Kruger, Lake Oswego, OR (US)

(72) Inventors: Justin M Metras, Portland, OR (US); Mieszko K Kruger, Lake Oswego, OR (US)

( * ) Notice: Subject to any disclaimer, the term of this patent is extended or adjusted under 35 U.S.C. 154(b) by 37 days.

(21) Appl. No.: 14/028,537

(22) Filed: Sep. 17, 2013

(65) Prior Publication Data

US 2014/0090873 A1     Apr. 3, 2014

Related U.S. Application Data

(60) Provisional application No. 61/702,225, filed on Sep. 17, 2012.

(51) Int. Cl.
H01R 33/00 (2006.01)
H01R 13/60 (2006.01)
H02G 3/30 (2006.01)

(52) U.S. Cl.
CPC ............ H01R 33/00 (2013.01); H01R 13/60 (2013.01); H02G 3/30 (2013.01)

(58) Field of Classification Search
CPC ............ H02G 3/30; H02G 3/22; H02G 3/24; H01R 13/00; H01R 13/60; H01R 33/00; B65D 63/10; F16L 3/12; F16L 3/137
USPC ............ 174/135, 68.1, 68.3, 72 A, 70 C; 248/68.1, 48.1, 49, 74.1, 74.2, 74.3; 24/3.1

See application file for complete search history.

(56) References Cited

U.S. PATENT DOCUMENTS

| | | | |
|---|---|---|---|
| 5,682,653 A | 11/1997 | Berglof et al. | |
| 6,349,904 B1 * | 2/2002 | Polad | 248/74.3 |
| 6,431,500 B1 * | 8/2002 | Jacobs et al. | 248/51 |
| 6,491,271 B1 | 12/2002 | Adams | |
| 6,855,890 B1 | 2/2005 | Vasichek | |
| 7,312,399 B2 * | 12/2007 | Girot | 174/135 |
| 7,436,974 B2 | 10/2008 | Harper | |
| 7,607,618 B2 * | 10/2009 | Mori et al. | 248/68.1 |
| 8,203,077 B2 * | 6/2012 | Honeycutt et al. | 174/135 |
| 8,399,769 B2 | 3/2013 | Doll | |
| 8,598,462 B2 * | 12/2013 | Li | 248/68.1 |
| 8,695,170 B2 * | 4/2014 | Honeycutt | 24/3.1 |
| 2005/0025329 A1 | 2/2005 | Lee | |
| 2009/0238395 A1 | 9/2009 | Jubelirer | |
| 2010/0159741 A1 | 6/2010 | Rothbaum | |
| 2011/0252606 A1 | 10/2011 | Rothbaum | |
| 2011/0253571 A1 | 10/2011 | Rothbaum | |

FOREIGN PATENT DOCUMENTS

AT    PCT/IB2008/052139 A1    12/2008

* cited by examiner

*Primary Examiner* — Angel R Estrada
(74) *Attorney, Agent, or Firm* — Kenechi R. Agu, Esq.

(57) ABSTRACT

Implementations of the present disclosure provide a cable restraint and management apparatus comprising of a pliable material, a mechanism attached or embedded within said material that allows for an enclosed form and or open form of said material, and a cable attachment mechanism configured to attach an electronic cable, power cord, string, jewelry, clothing or any object with attached cordage requiring hanging or restraint.

13 Claims, 8 Drawing Sheets

CORDAGE RESTRAINT AND MANAGEMENT SYSTEM

CROSS-REFERENCE TO RELATED APPLICATION

This application claims the benefit of U.S. Provisional Application No. 61/702,225, filed Sep. 17, 2012.

TECHNICAL FIELD

The disclosed embodiments relate generally to a system for restraining and managing chains on jewelry or clothing, ropes or twine, hoses and cords used in electronic products, decorative hanging elements, and in particular to a system for managing cables associated with earphones, power cables, data cables, decorative lighting cords and hanging elements for decorative items.

BACKGROUND

Chains, ropes, hoses and cords typically have smaller diameters than their length. The nature of these items is that their overall length and flexibility can be inconvenient while in use and cumbersome when storing. For example, during use cordage often interferes with the surrounding environment and proves to be a nuisance or even a safety hazard. Unorganized cordage can also prove to be unsightly and ruin the aesthetic appeal of an environment. When not in use, cordage is typically coiled for storage or transportation, and unless being hung or kept separate, the coiled cordage often becomes tangled with other cordage or objects.

Consumer electrical cables generally have one or more connectors on opposing ends. In some instances, the cables may extend from a physical device, and sometimes include lighting or electrical elements spanning partially or through the length of the entire cable. Moreover, cordage spans a wide range of lengths, thicknesses, and shapes. When in use, cables are typically hung, or laid upon a surface or floor. In permanent installation cases, cables are mounted in some way, for example, with hardware fasteners.

When in use, some cables have the tendency to hang or interfere with their environment. One example is headphones used by an individual while exercising. The unrestrained cable flaps cause many undesirable side effects: impact induced noise from vibrations in the cable, uncomfortable slapping, and interference with the user's arms and/or objects in the environment or equipment. Another example of unrestrained cordage interference is when power cables attached to desk lamps are laid out on the floor, which can easily cause an individual to trip and fall. Another example of unrestrained cordage is a charging cable attached to a computer that is laid on a coffee table. The user, or someone else within the same environment, can easily trip on the cable causing the device to fall on the floor and be damaged.

When not in use, cordage is typically coiled or wrapped when stored. When not hung or separated, cordage has the tendency to tangle with other objects in drawers for example. This proves to be very cumbersome when the cable is retrieved for later use as the user must spend considerable time untangling the cable. Additionally, such entanglement may irreparably damage the cordage or other stored items.

BRIEF SUMMARY OF THE INVENTION

Embodiments of the current apparatus relate to electronic cables, power cord, string, jewelry, clothing or any object with attached cordage requiring hanging or restraint, and more specifically to consumer electronic cordage such as headphones and charging cables.

Prior solutions provide a variety of unsuccessful techniques for cable restraint and management. Most prior solutions include a means for either a cable restraint or cable management, but there is presently no solution that accomplishes both functions.

Moreover, many of the cordage restraining methods available on the market today are bulky, heavy, poorly constructed, and expensive. In addition, most cordage restraining methods do not combine the ability to neatly organize and store cordage.

In short, many of the cordage management methods available on the market today do not provide a way to restrain cordage. Thus, a cordage restraint and management system, without the drawbacks described above, is desired.

DETAILED DESCRIPTION OF THE DRAWINGS

Figure 1A:
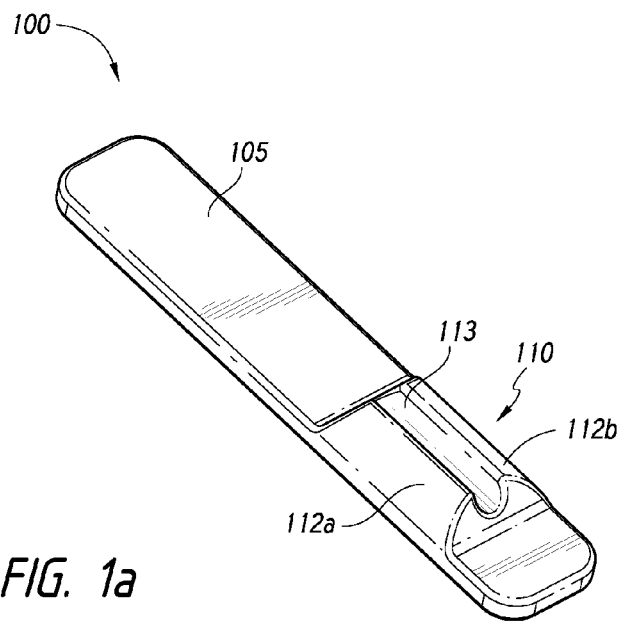
FIG. 1a illustrates a perspective view of an open cordage restraint and management system embodiment in accordance with some implementations of the current subject matter.

The following discussion is directed to various examples. Although one or more of these examples may be discussed in detail, the implementations disclosed should not be interpreted, or otherwise used, as limiting the scope of the disclosure, including the claims. In addition, one skilled in the art will understand that the following description has broad application, and the discussion of any implementations is meant only to be an example of one implementation, and not intended to suggest that the scope of the disclosure, including the claims, is limited to that implementation. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Referring now in more detail to the drawings in which like numerals identify corresponding parts throughout the views, FIG. 1a illustrates a perspective view of an open cordage restraint and management system embodiment in accordance with some implementations of the current subject matter. As shown here, the cordage restraint and management apparatus comprises of a pliable material as the main body 105, a fastening mechanism attached or embedded within said material that allows for an enclosed form and or extended form, and a cable attachment mechanism 110 configured to attach cordages. The pliable body material 105 may consist of a single material or a plurality of materials such as, but not limited to, leather, rubber, silicones, elastomers, cloth and textiles, and organic materials. Moreover, the pliable material 105 may consist of any shape, such as an elongated, multi-pronged, and curved shape. The cable attachment mechanism 110 includes a pair of protruding restraint elements 112a and 112b. More particularly, the restraint elements 112a and 112b extend perpendicularly away from the pillar body 105 and curve slightly inward toward each other at its uppermost point so as to form an inner cavity area 113 for placement of the cordage as will be described in further detail below.

Figure 1B:
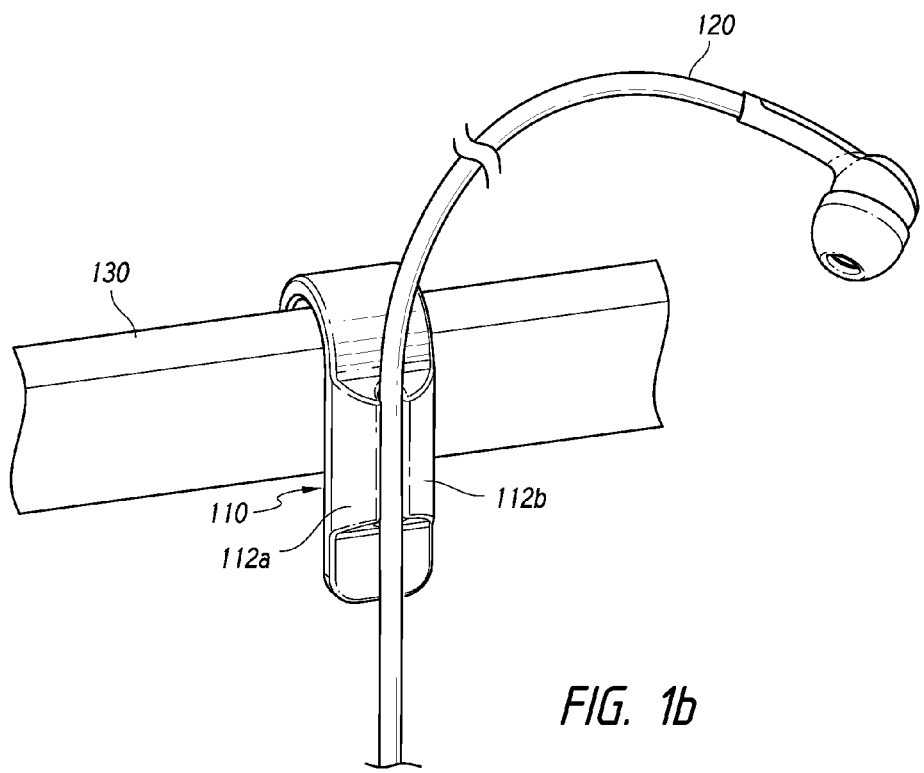
FIG. 1b illustrates a perspective view of a closed cordage restraint and management system restraining a single headphone ear bud to the collar of a t-shirt in accordance with some implementations of the current subject matter.

FIG. 1b illustrates a perspective view of a closed cordage restraint and management system restraining a single headphone ear bud to the collar of a t-shirt in accordance with some implementations of the current subject matter. In the present example, the cordage 120 is represented by a headphone cord. As shown, the flexible body 105 is folded near a central area thus forming a clip-like attachment for one's shirt collar (object 130). Furthermore, the cable attachment mechanism 110 holds the cordage 120 securely against the flexible body 105 via protruding restraint elements 112a and 112b. That is, the fastening means and cable attachment mechanism 110 are utilized together to maintain the cordage restraint apparatus securely against the shirt collar 130. In accordance with implementations described herein, the fastening means (joining of main body ends) may take several forms: an adhesive mount, a mechanical frictional mechanism, a flat engagement surface, a mechanical clasp, a spring-loaded frictional mechanism, and/or a magnetic attachment feature.

Figure 1C:
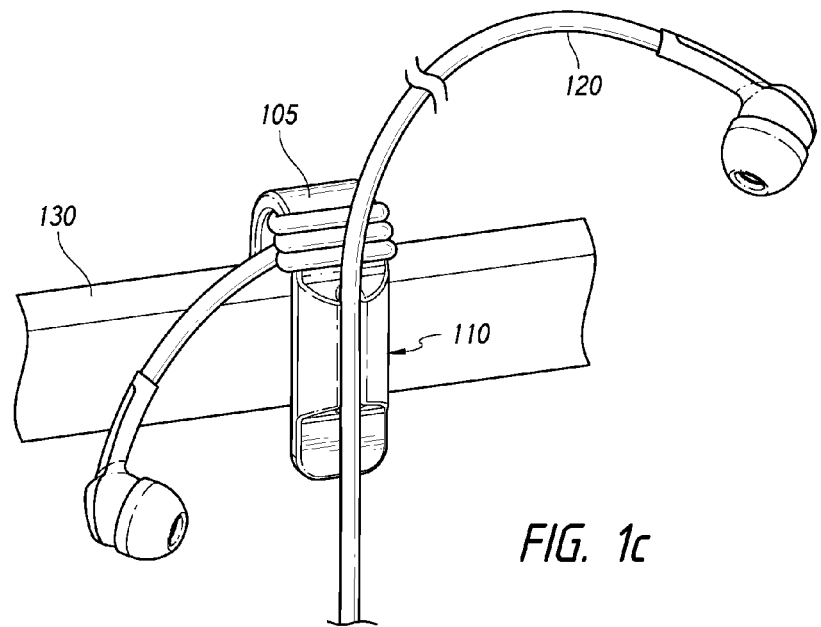
FIG. 1c illustrates a perspective view of a closed cordage restraint and management system restraining a first headphone ear bud to the collar of a t-shirt and with a second headphone ear bud wrapped in accordance with some implementations of the current subject matter.

FIG. 1c illustrates a perspective view of a closed cordage restraint and management system restraining a first headphone ear bud to the collar of a t-shirt and with a second headphone ear bud wrapped in accordance with some implementations of the current subject matter. As shown here, the cordage 120 of the headphones are wrapped around the flexibly body 105 of the cordage restraint apparatus. The object or shirt pocket 130 combined with the curvature of the flexible body 105 serve to hold the wrapped portion of the cordage firmly in place. In addition, the remaining portion (i.e., uncoiled portion) of the cordage 120 is held securely against the body 105 via the cordage attachment mechanism 110 as in the previous embodiment.

Figure 1D:
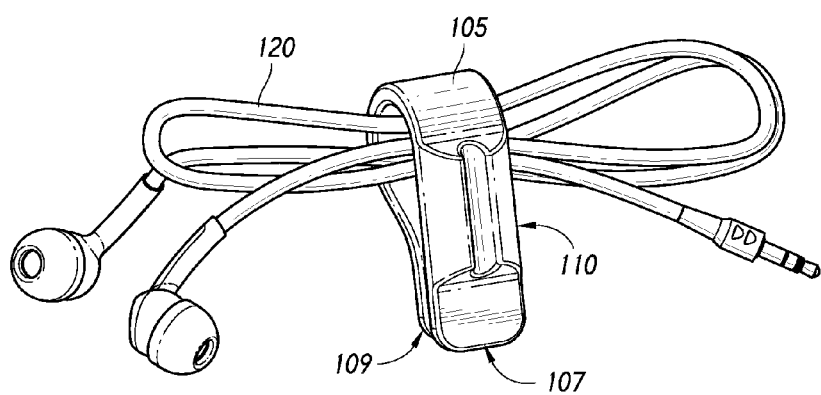
FIG. 1d illustrates a perspective view of a closed cordage restraint and management system with a coiled headphone set ready for storage in accordance with some implementations of the current subject matter.

FIG. 1d illustrates a perspective view of a closed cordage restraint and management system with a coiled headphone set ready for storage in accordance with some implementations of the current subject matter. The cordage restraining and management system may be used multiple ways for managing unwieldy cords and cable. For example, and as shown in FIG. 1d, the cordage attachment mechanism 110 is not utilized to restrain the cordage 120, but rather, the cordage 120 is held in place via the opening created through joining of the top end 107 of pliable body 105 with the back end 109 of pliable body 105. More particularly, the opening formed by said closure is small enough such that sufficient friction is used to maintain the cordage firmly therein.

The fastening means utilized to facilitate joining of opposite ends 107, 109 and configure the shape of the pliable material body 105, may take many forms. One such form is a magnet embedded within a front end 107 and a corresponding magnet formed along an opposite back end 109. The pliable body 105 may also comprise of a magnet and a ferrous material. Additionally, the pliable body 105 may include a magnet on each end 107, 109 along with magnetic elements spread throughout the length of the pliable material, or a magnet and multiple ferrous materials. Yet another configuration includes formation including a malleable metal or rigid material capable of holding shape but easily opened through force from a user. Alternatively, the pliable body 105 may represent a slap bracelet or similar bistable structure for example.

Figure 1E:
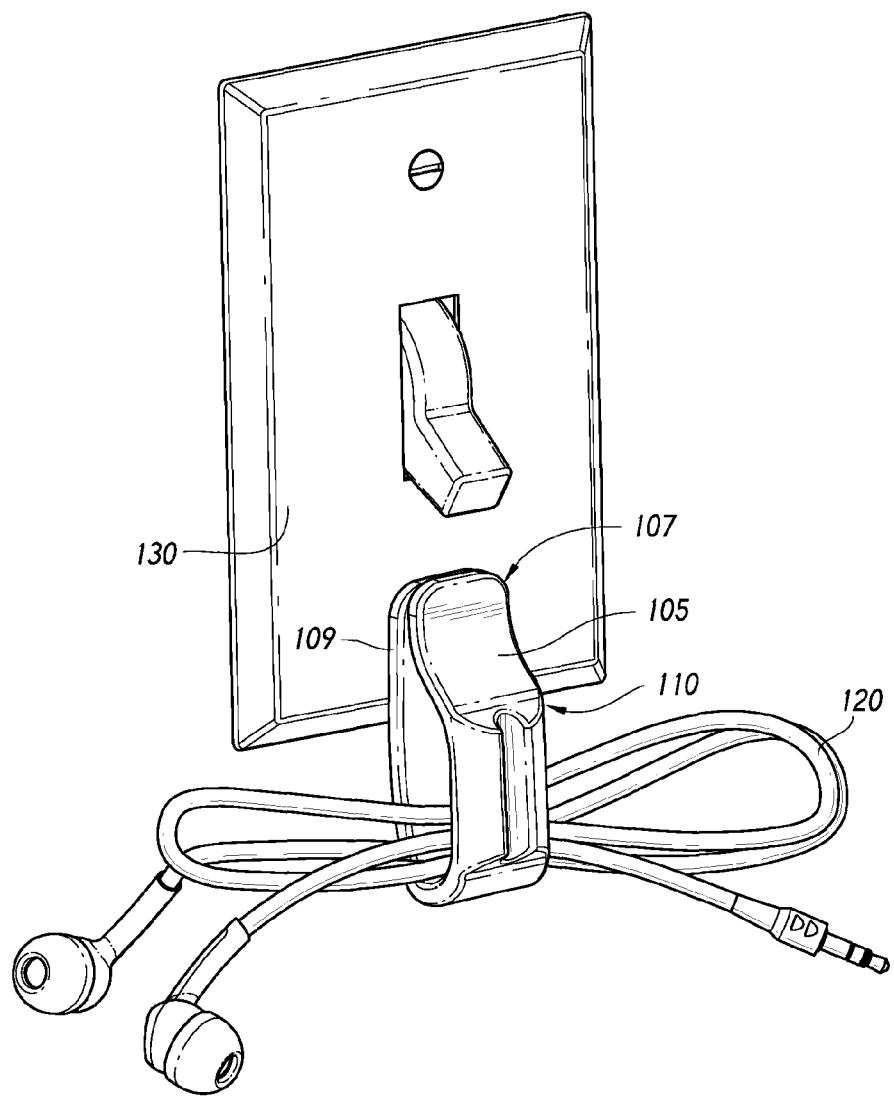
FIG. 1e illustrates a perspective view of a magnetic closed cordage restraint and management system with a coiled headphone set hung from the screw of a light switch plate in accordance with some implementations of the current subject matter.

FIG. 1e illustrates a perspective view of a magnetic closed cordage restraint and management system with a coiled headphone set hung from the screw of a light switch plate in accordance with some implementations of the current subject matter. Embodiments of the current apparatus include cordage 120, such as that attached to a pair of headphones, and a restraining mechanism 110. As described above, the main body 105 includes a first contact end 107 and a second contact end 109 formed opposite the first end 107. The contact ends 107, 109 are designed to further restrain the movement of the cordage 120 via the opening formed through coupling of the two ends 107, 109. In addition, the main body 105 may be attached to another object 130 such as the screw of a light switch as depicted in FIG. 1e. Accordingly, the apparatus of the present embodiments offers a convenient storage mechanism for easy placement and retrieval.

Figure 2A:
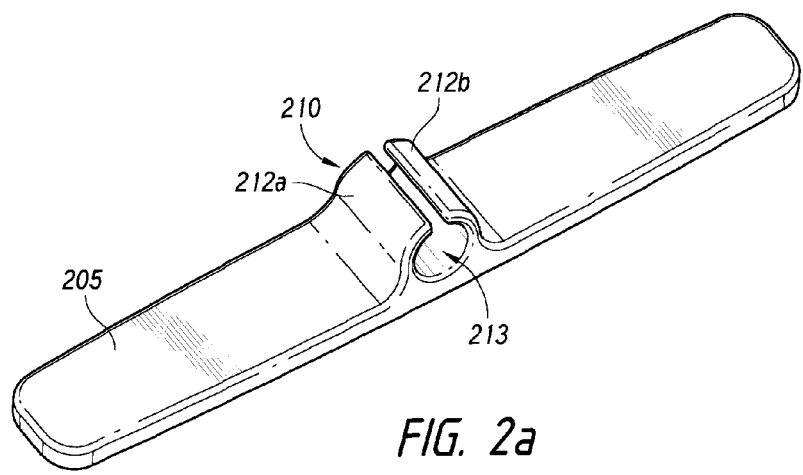
FIG. 2a illustrates a perspective view of an open cordage restraint and management system embodiment in accordance with some implementations of the current subject matter.

FIG. 2a illustrates a perspective view of an open cordage restraint and management system embodiment in accordance with some implementations of the current subject matter. In the present example, the restraint mechanism 210 is formed in a central area of the body 205. Restraining portions 212a and 212b extend in a length-wise direction (i.e., corresponding with length of main body ends) from the top surface of the body 205 and toward the opposing portion. As shown here, restraining portion 221b faces and nearly abuts the opposite restraining portion 212b so as to leave sufficient space to enable user placement of the cordage within the cavity area 213 of the apparatus.

Figure 2B:
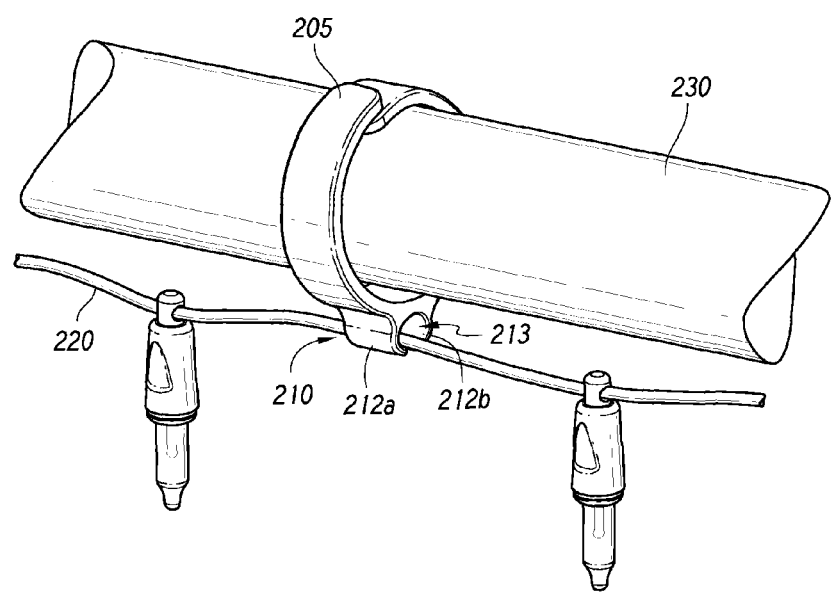
FIG. 2b illustrates a perspective view of an open cordage restraint and management system embodiment restraining a decorative cable with light bulbs to a pipe in accordance with some implementations of the current subject matter.

FIG. 2b illustrates a perspective view of an open cordage restraint and management system embodiment restraining a decorative cable with light bulbs to a pipe in accordance with some implementations of the current subject matter. In the example depicted in FIG. 2b, the cordage restraint and management apparatus is attached to an object such as pole 230. Specifically, ends of the flexible body 205 are wrapped around the pole 230 and join at a common end. The decorative light bulb cable 220 may then be positioned within the cavity area 213 of the main body 205 so as to seemingly hang directly from the pole 230. The configuration of the present implementations thus provides for an aesthetically-pleasing and simplified hanging tool.

Figure 2C:
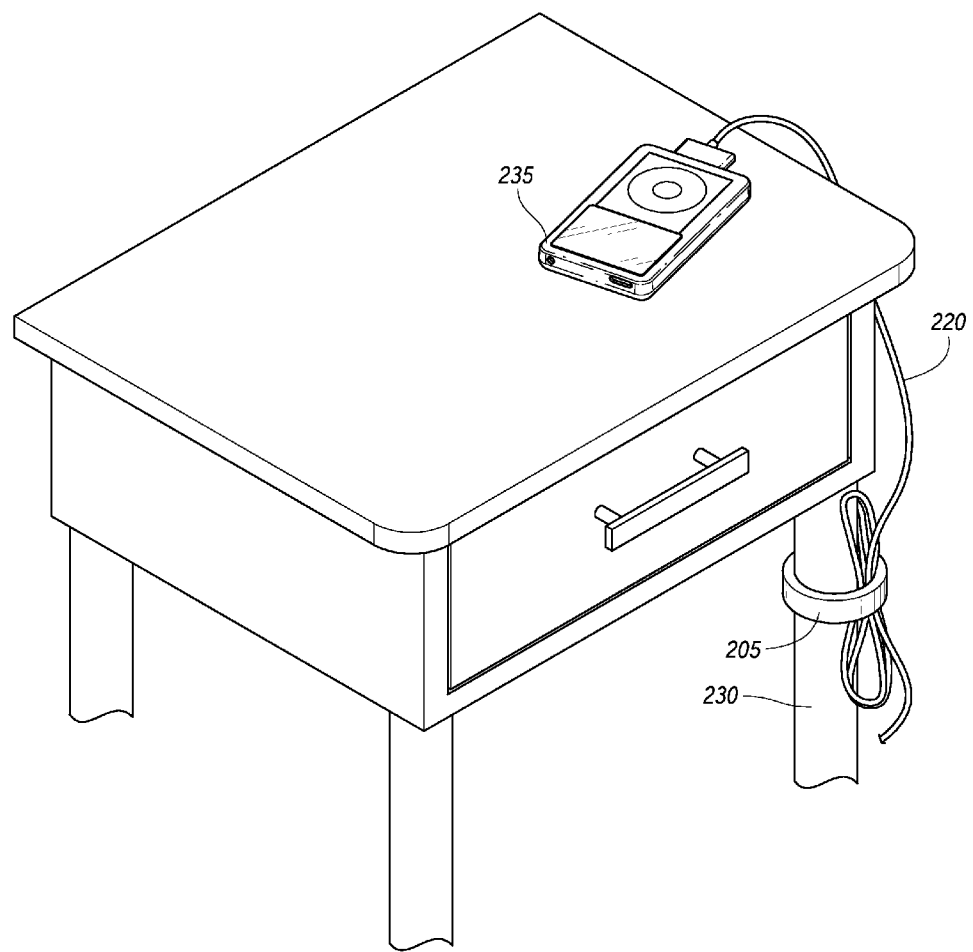
FIG. 2c illustrates a perspective view of an open cordage restraint and management system embodiment restraining excess cabling of a mobile device charger to the leg of a nightstand in accordance with some implementations of the current subject matter.

FIG. 2c illustrates a perspective view of an open cordage restraint and management system. As shown in the present embodiment, the apparatus of the present disclosure may also be used to restrain excess cabling 220 associated with a mobile device 235. Here, a charging cable 220 extends from the mobile device 220 and down towards the leg of a nightstand. The main body 205 may be wrapped around a leg 230 of the nightstand so as to grip a coiled portion of cordage 220 firmly against the leg 230. Thus, implementations described herein are able to eliminate the unsightly and potentially hazardous dangling of excessive cordage.

Figure 3A:
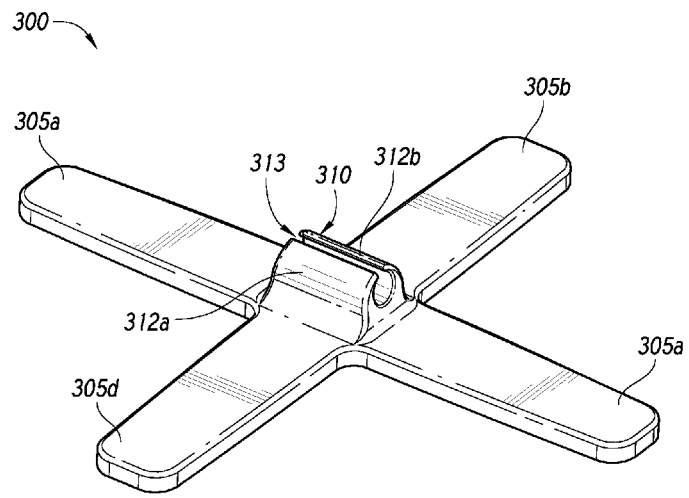
FIG. 3a illustrates a perspective view of an open cordage restraint and management system embodiment in accordance with some implementations of the current subject matter.
Figure 3B:
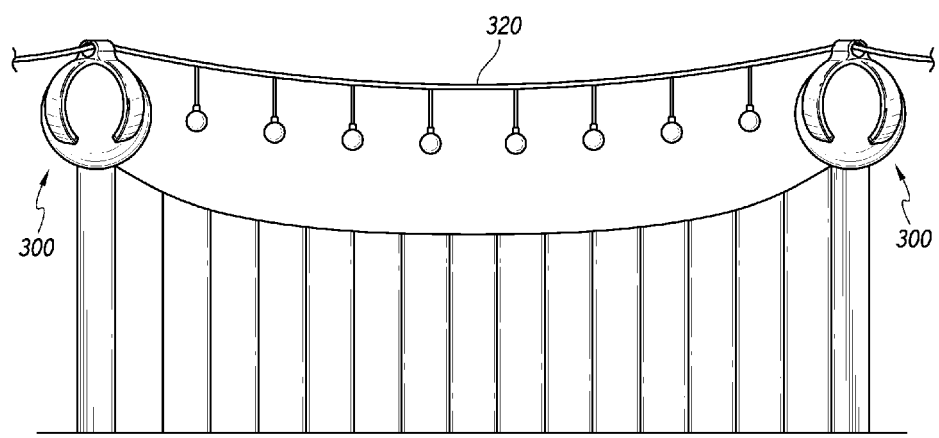
FIG. 3b illustrates a perspective view of an open cordage restraint and management system embodiment restraining a decorative cable with light bulbs to the balls of a fence post in accordance with some implementations of the current subject matter.

FIG. 3a illustrates a perspective view of an open cordage restraint and management system embodiment in accordance with some implementations of the current subject matter. In the depicted implementation, the main body includes four elongated members 305a-305d that extend from a central area thereof. As in the previous embodiments, the restraining portions 312a and 312b extend upwards from the top surface of the main body and are configured to clench a cord within the cavity area 313. For example, FIG. 3b illustrates a perspective view of the open cordage restraint and management system 300 being used to restrain a decorative cable having light bulb balls while attached to a fence post.

Figure 4:
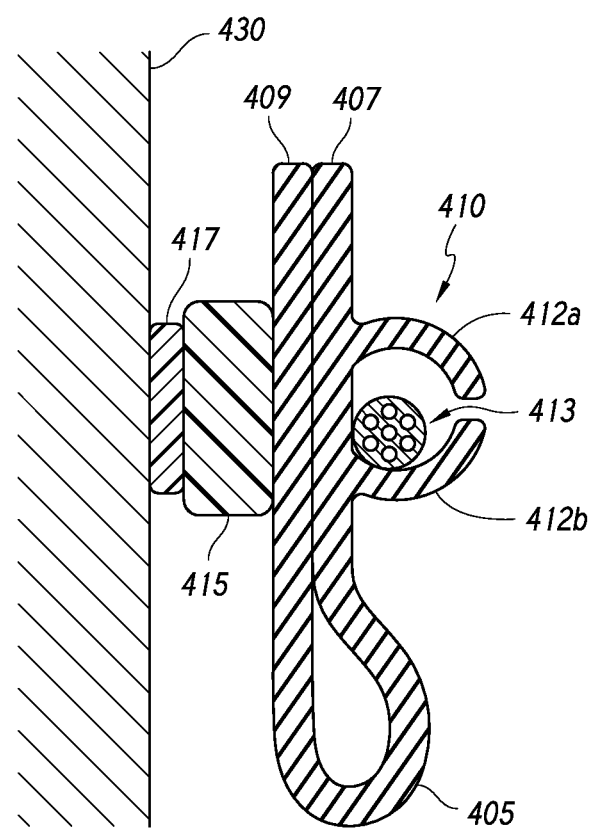
FIG. 4 illustrates a cross-sectional view of a magnetic version of the cordage restraint and management system embodiment attached to a wall via a temporarily adhered magnet in accordance with some implementations of the current subject matter.

FIG. 4 illustrates a cross-sectional view of a magnetic version of the cordage restraint and management system embodiment attached to a wall via a temporarily adhered magnet in accordance with some implementations of the current subject matter. In the present example, the apparatus includes a main body 405, a restraint element 410, and first and second external magnets 415 and 417. As shown here, the first external magnet 415 may be attached to an upper surface (same surface as formation of the restraint element 410), while the second external magnet 417 is attached to the first external magnet 415 on a first side and to the wall on an opposite side thereof. Additionally, the main body 405 is bent along a central region in which the first end 407 is joined congruently with the second end 409 of the main body. In this way, the main body 405 is substantially parallel with the wall 430 and restraining such that the restraining mechanism 410 extends in a direction away from the wall 430. Accordingly, when cordage is placed within the cavity area 413 of the restraining portion 410, there is a smaller likelihood of the cordage accidently falling out of the space formed between the first and second restraining element s412a and 412.

Figure 5:
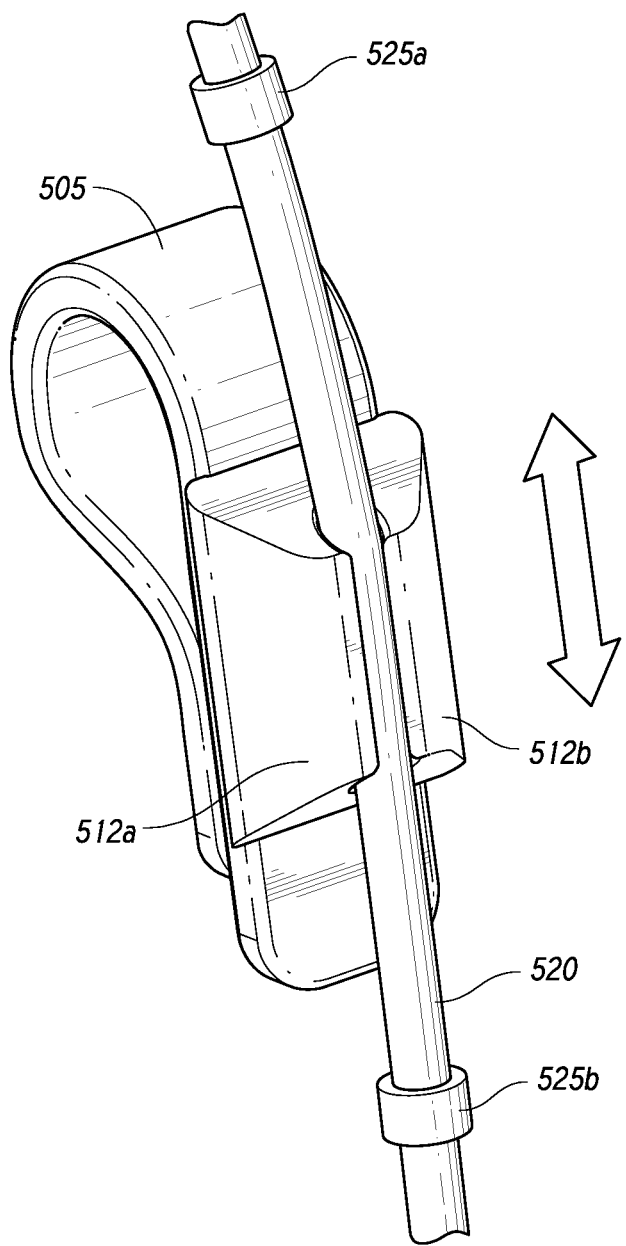
FIG. 5 illustrates a perspective view of a closed cordage restraint and management system with an attached cordage member which is loosely attached but is capable of moving longitudinally along the length of the cordage, but limited within the confines of the stopping attachments in accordance with some implementations of the current subject matter.

FIG. 5 illustrates a perspective view of a closed cordage restraint and management system in accordance with some implementations of the current subject matter. Here, cordage 520 is loosely attached and set within the restraint portions 512a and 512b, but is also capable of moving longitudinally along the length of the cordage 520. The movement of the cordage, however, is limited within the confines of the stopping attachments 525a and 525b. Such a configuration enables a system that can both effectively retain excessive cordage while also providing for simplified adjustment and management of said cordage.

Not all components, features, structures, characteristics, etc. described and illustrated herein need be included in a particular example or implementation. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some examples have been described in reference to particular implementations, other implementations are possible according to some examples. Additionally, the arrangement or order of elements or other features illustrated in the drawings or described herein need not be arranged in the particular way illustrated and described. Many other arrangements are possible according to some examples.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A apparatus comprising:
   a flexible main body configured to hold cordage when in a folded position; and
   a movable restraint element formed on an upper surface of the flexible body and configured to firmly hold a portion of said cordage,
   wherein the main body includes a pair of magnetic elements formed on opposite ends of the main body for coupling together when in the folded position.

2. The apparatus of claim 1, wherein the restraint element comprises of two protruding portions that each extend perpendicularly away from the flexible body.

3. The apparatus of claim 2, wherein the two protruding portions curve inward and towards each other near a topmost point so as to form an inner cavity between said topmost point and the flexible body.

4. The apparatus of claim 2, wherein the portion of cordage is held securely within the cavity area by the two protruding portions of the restraint element.

5. The apparatus of claim 1, wherein coupling of the magnetic elements forms an opening capable of holding coiled or wrapped cordage in a fixed position.

6. The apparatus of claim 1, wherein the magnetic elements are used to attach the main body to an object.

7. The apparatus of claim 1, wherein the entire main body includes magnetic elements spread throughout the length of the main body.

8. The apparatus of claim 1, wherein the portion of cordage is held securely within the cavity area by the two protruding portions of the restraint element.

9. The apparatus of claim 1, wherein coupling of the magnetic elements forms an opening capable of holding the cordage in a fixed position.

10. The apparatus of claim 1, wherein the entire main body includes magnetic elements spread throughout the length of the main body.

11. An apparatus for cable restraint and management, the apparatus comprising:
    a pliable main body configured to hold cordage when in a folded position,
    wherein the main body includes magnetic elements formed on opposite ends for attaching to an object; and
    a moveable restraint element formed on an upper surface of said main body and comprising of two protruding portions that extend away from the main body for retaining a portion of said cordage.

12. The apparatus of claim 11, wherein the two protruding portions curve inward and towards each other near a topmost point so as to form an inner cavity between said topmost point and the flexible body.

13. An apparatus for cable restraint and management, the apparatus comprising:
    a flexible body having magnetic elements formed on opposite ends and configured to attach to an object, wherein coupling of the magnetic elements forms an opening; and
    a movable restraint element formed on an upper surface of said flexible body and comprising of two protruding portions that extend away from the flexible body and configured to firmly hold a portion of cordage,
    wherein the restraint element extends away from the flexible body and includes two protruding portions curve inward and towards each other near a top end so as to form an inner cavity between the top end and the flexible body, and
    wherein a portion of cordage is capable of being held securely either within the cavity area by the two protruding portions of the restraint element or by said opening.

* * * * *